Patented Dec. 11, 1923.

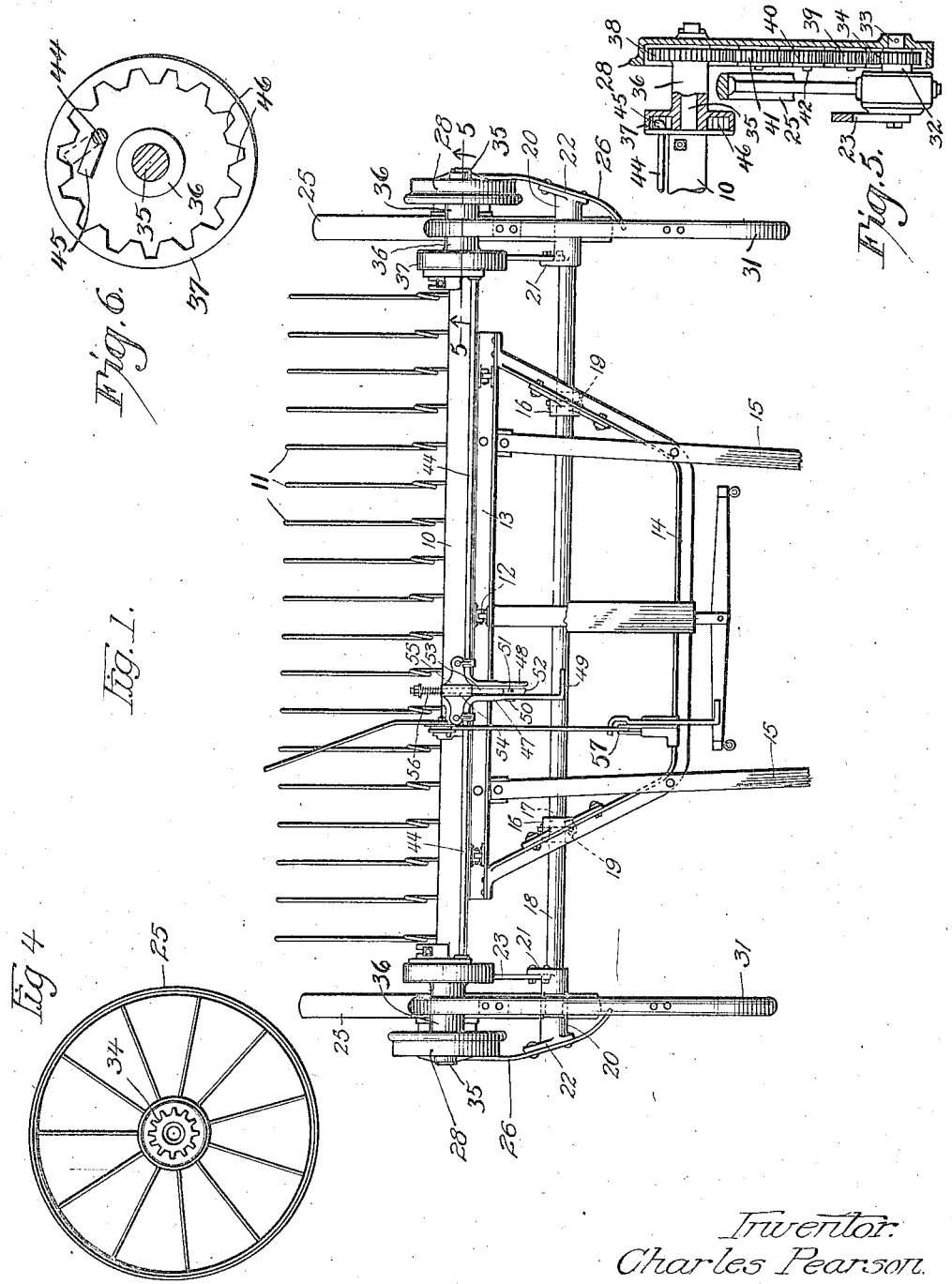

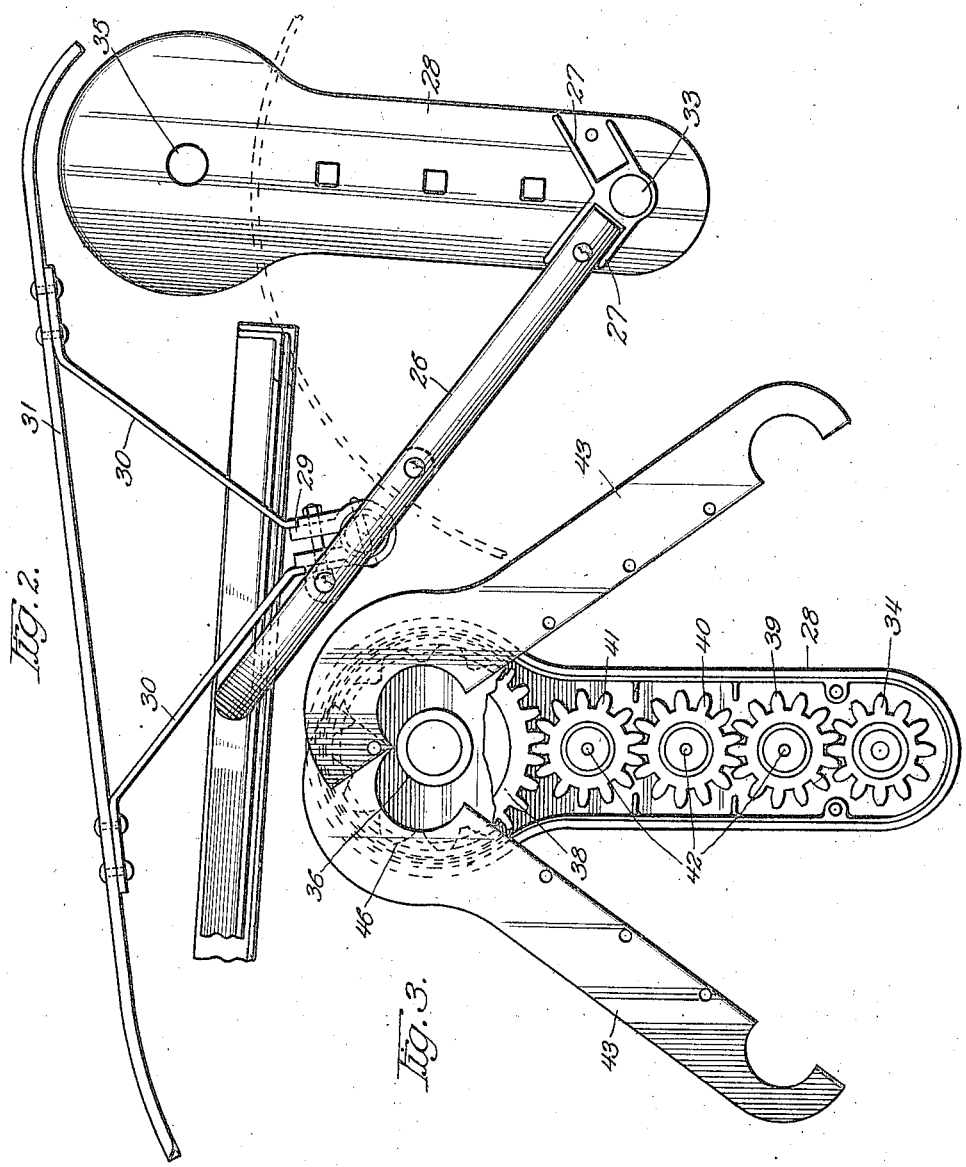

1,477,382

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

HAYRAKE.

Application filed February 24, 1919. Serial No. 278,703.

*To all whom it may concern:*

Be it known that I, CHARLES PEARSON, a citizen of the United States, residing at Chicago, in the county of Cook and State of Illinois, have invented certain new and useful Improvements in Hayrakes, of which the following is a full, clear, and exact specification.

My invention relates to hay rakes of the draft dump type.

The object of the invention is to provide a construction of rake adapted to be used in orchards, and under conditions similar to those there encountered where overhanging branches interfere with the use of the ordinary high wheeled rake by engaging with the moving parts of the rake over the frame thereof.

With this object in view, I have embodied my invention in a rake having the frame members and operative elements of the dumping mechanism located as low down or as close to the ground as is possible with a machine using a practical size of rake tines.

In the embodiment of the invention illustrated, the wheels are located below the plane of the rake head, and power is transmitted through suitable mechanism, such as a train of gears, from the wheels to the rake head. The various moving parts of the rake are shielded to prevent any interference therewith by overhanging branches.

In the drawings illustrating the invention—

Figure 1 is a top plan view of the improved rake construction;

Fig. 2 is a side elevational view on an enlarged scale showing the shield members;

Fig. 3 is a side elevation on an enlarged scale showing the train of gears connecting the rake wheels to the operating shaft for the dumping mechanism;

Fig. 4 is a detail view illustrating the construction of the wheel and the gearing attached thereto;

Fig. 5 is a sectional view taken on the line 5—5 of Fig. 1, showing the train of gears that actuate the constantly rotating ratchet wheel; and Fig. 6 is a detail view on an enlarged scale of the constantly rotating ratchet wheel and its cooperating pawl.

The improved draft dump rake illustrated in the drawings is provided with the usual rake head 10, having rake tines 11 of any suitable construction secured thereto, the front side of the rake head being hingedly connected, as shown at 12, to the draft member 13. The draft member 13 forms a part of the usual draft frame having a U-shaped forwardly extending frame 14 secured thereto, suitable thills 15 being secured to the member 14 and at their rear ends to the member 13. The rearwardly extending legs of the U-shaped frame member 14 are provided intermediate their ends with depending brackets 16, having formed at their lower ends aligned apertures 17 through which extends a transverse tubular frame member 18, the member 18 being secured in the brackets 16 by means of suitable pins 19. The transverse frame member 18 has secured thereto at its opposite ends castings 20, having on their inner ends off-set lugs 21 and on their outer ends flanges or lugs 22. The lugs 21 are connected by means of brace bars 23 to the inner ends of stub shafts 33, which carry the supporting wheels 25 of the rake. The flanges or lugs 22 are connected by means of brace bars 26 to channels 27 formed at the lower ends of casings 28, which enclose the transmission gearing from the supporting wheels to the dumping shaft, as hereinafter described.

From an inspection of Fig. 2 it will be seen that the casings 28 for the transmission gearing are each provided with two channeled portions 27, since in manufacturing these casings in this manner they are interchangeable and can be used on either side of the rake. The castings 20 are also provided intermediate their ends with upwardly extending lugs 29, to which are secured the lower ends of upwardly diverging bracing members 30. The brace members 30 carry at their upper ends curved shield members 31, which extend over the supporting wheels, and also upwardly to a plane above the rake head and transmission gearing, thereby shielding these parts from overhanging branches.

In addition to forming braces for the frame, the brace bars 26 also act as shield members extending inwardly at their front ends to a position in front of the supporting wheels, and being curved rearwardly and downwardly to the channels 27, which are adjacent the axis of the supporting wheel. The supporting wheels 25 have secured to the hub portions thereof sleeves 32, which are journaled on the stub shafts 33 which carry the supporting wheels, and the sleeves 32 have secured thereto or formed integral therewith at their outer ends gears 34. The gear casings 28 are supported at their lower ends on the stub shafts 33, and at their upper ends are carried by outwardly projecting shafts 35 secured to the outer ends of the rake head 10. To prevent displacement of the casings from the shafts, cotter pins are provided in suitable openings in the shafts. The shafts 35 also support sleeves 36 having formed on their inner ends ratchet wheels 37, the sleeves 36 also having secured thereto or formed thereon at their outer ends gears 38. The gears 34 and gears 38 are operatively connected through series of idler gears 39, 40 and 41, which are rotatably mounted on stub journal pins 42 carried by the casings 28. As illustrated in Fig. 3, the casing 28 is channeled to receive the gears above described, and in order to completely enclose the gears sheet metal plates 43 are removably secured to the gear casing 28 in any suitable manner. If desired, the journal pins for the idler gears may be extended through the sheet metal members 43, and cotter pins may be passed through the outer ends thereof to secure these members in place; suitable apertures being provided adjacent the inner surfaces of the members 43, these apertures being so located that when the plates are in closed position and overlap the apertures will be in alignment with the journal pins 42.

As is usual with hay rakes of the draft dump type, suitable clutching mechanism is provided to connect the rake head with the power derived from the supporting wheels, and any suitable clutching mechanism may be used—that illustrated in the drawings of this application being identical with that shown and described in applicant's prior Patent, No. 836,206, issued November 20, 1906. Since this dumping mechanism is fully described in the patent referred to, it is believed that a brief description in this specification will suffice.

Referring then to the clutch mechanism for connecting the rake head to the power derived from the supporting wheel, it will be seen that a sectional rock shaft 44 is journaled on the rake head, and is provided at its outer ends with the usual pawls 45, which are adapted to engage the teeth 46 formed on the inner annular surfaces of ratchet wheels 37. Rock shaft 44 is provided with forwardly extending portions 47 and 48, the portion 47 having formed thereon at its front end a transverse offset foot treadle 49. The members 47 and 48 are connected together by means of a bolt 50, this bolt having journaled thereon a sheave 51. The sheave 51, as clearly shown in the patent referred to, is adapted to engage with an upwardly extending offset portion 52 of a latch bar 53, which is slidably mounted in a barrel portion 54 of a bracket 55 secured to the rake head. The latch bar 53 carries at its rear end a spring 56, which normally forces the latch bar in a rearward direction, and, as described in Patent No. 836,206, holds the rock shaft 44 in a position where the pawls are disengaged from the ratchet wheels. When it is desired to rotate the rock shaft and engage the pawls with the ratchet, the operator presses down upon the foot treadle 49, thereby shifting the sheave 51 with respect to the portion 52 of latch bar 53, and engaging the pawls with the ratchet wheels. For further reference to the details of the latching and enlarging construction, attention is directed to the patent above referred to.

The usual toggle locking mechanism 57 is employed, but since applicant is not claiming this construction, and the construction is fully illustrated in Patent No. 836,206 above cited, a description of this toggle locking mechanism is not deemed necessary.

A brief description of the operation of my improved hay rake will now be given. As the rake is pulled forwardly through an orchard the tines 11 will gather the hay in the usual manner, and when the operator desires to dump the rake pressure is exerted on the foot treadle 49, and the pawls carried by the rock shaft 44 will be thrown into engagement with the ratchet wheels 37. The ratchet wheels 37 are constantly rotated by means of the trains of gears which transmit the power from the supporting wheels, and the gears 34 carried thereby to the ratchet wheels and the rake will be dumped in the usual manner. As above pointed out in the specification, the shields 31 prevent the overhanging branches from engaging with the supporting wheels and other parts of the rake, and the combined brace and shield members 26 also serve to protect the wheels from engagement with branches or other foreign substances.

It will be readily seen that a very compact and efficient construction of the rake has been designed, and a construction that is well adapted to use in orchards and in other locations where similar conditions are encountered.

The device may also be easily and quickly converted into a conventional type of hay rake having high wheels, for use in open fields or meadows. Such conversion may be effected by withdrawing the cotter pins from the ends of shafts 35 and removing castings 20 from frame member 18, whereupon the gear casing, the ratchets and supporting wheels may be removed. Ordinary high wheels may then be substituted for those removed. It will be appreciated that the entire transmission mechanism is removable as a unit, thereby expediting this conversion.

While I have, in the above specification, described one embodiment which my invention may assume, it should be understood that the construction illustrated has been shown merely for the purpose of presenting a practical embodiment of the invention, and that the invention is capable of modification, and modification may be employed without departing from the spirit and scope of the invention as expressed in the following claims.

What I claim is:

1. In a hay rake, a rake head, rake teeth carried thereby, a constantly rotating member journaled on said rake head, means for connecting said rake head to said constantly rotating member, and constantly actuating means located in a plane below said constantly rotating member.

2. In a hay rake, a rake head, rake teeth carried thereby, a rotative member journaled on and adapted to be connected to said rake head, means for rotating said rotative member with said rake head, and a plurality of constantly rotating gears located in a position below said rake head for actuating said rotative member.

3. In a hay rake, a rake head, a rotative member, means for connecting said rotative member to said rake head, power actuated means for operating said rotative member, and power transmitting gearing mechanism comprising a plurality of gears disposed in a vertical line below said rotative member for connecting the source of power with said rotative member.

4. In a hay rake, a frame, a rake head carried thereby, supporting wheels for said frame located directly below the plane of said rake head, and means for transmitting power from said wheels to said rake head.

5. In a hay rake, a rake frame, a rake head carried thereby, supporting wheels located below and under the plane of said rake head, and gearing mechanism located outside of said wheels for transmitting power from said wheels to said rake head.

6. In a hay rake, a rake frame, a rake head, rake mechanism carried thereby, supporting wheels located below and under the plane of said rake head and a plurality of gears arranged in a vertical line outside of said wheels for transmitting the power from said wheels to said rake head.

7. In a hay rake, a frame, a rake head carried thereby, supporting wheels located below the plane of said rake head, a constantly rotating member carried by said rake head, and power transmission mechanism between one of said supporting wheels and said constantly rotating member.

8. In a hay rake, a frame, a rake head carried thereby, supporting wheels for said frame located below the plane of said rake head, rotative members carried by said rake head, and means including an enclosed train of gearing for transmitting power from said supporting wheels to said rotative members.

9. In a hay rake, a rake head, rake teeth carried thereby, and means for dumping said rake operatively connected to said rake head and including a drive wheel and power transmitting mechanism, said means being removable as a unit from said rake head.

10. In a hay rake, a rake head, rake teeth carried thereby, and means for dumping said rake head including a wheel and gearing operatively connecting said wheel and said rake head, said wheel and gearing being removable as a unit from said rake head.

11. In a hay rake, a rake head, rake teeth carried thereby, and means for dumping said rake including a wheel, a casing carried by said rake head and supported on said wheel and gearing carried by said casing and operatively connecting said wheel and rake head, said casing, gearing and wheel being removable as a unit from said rake head.

12. In a hay rake, a rake frame and rake head carried thereby, supporting wheels for said rake frame and means positioned outside the wheels for transmitting the power from said wheels to said rake head.

13. In a hay rake, a rake frame and rake head carried thereby, supporting wheels located under said rake head for said rake frame, and means positioned outside the wheels for transmitting the power from said wheels to said rake head.

In testimony whereof I affix my signature.

CHARLES PEARSON.